United States Patent
Kim et al.

(10) Patent No.: US 11,155,691 B2
(45) Date of Patent: *Oct. 26, 2021

(54) METHOD FOR REPRODUCING POLYESTER CONTAINER AND POLYESTER FILM USED IN THE METHOD

(71) Applicants: SKC CO., LTD., Gyeonggi-do (KR); SKC INC., Covington, GA (US)

(72) Inventors: Chul Kyu Kim, Gyeonggi-do (KR); Yongdeuk Kim, Jeollanam-do (KR); Joo Ho Yang, Seoul (KR)

(73) Assignees: SKC CO., LTD., Gyeonggi-do (KR); SKC INC., Covington, GA (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/687,127

(22) Filed: Nov. 18, 2019

(65) Prior Publication Data
US 2021/0122899 A1    Apr. 29, 2021

(30) Foreign Application Priority Data
Oct. 29, 2019    (KR) .......... 10-2019-0135642

(51) Int. Cl.
| C08J 11/12 | (2006.01) |
| C08J 11/24 | (2006.01) |
| C08J 5/18 | (2006.01) |
| C08J 11/16 | (2006.01) |

(52) U.S. Cl.
CPC ............ *C08J 11/24* (2013.01); *C08J 5/18* (2013.01); *C08J 11/16* (2013.01); *C08J 2367/02* (2013.01)

(58) Field of Classification Search
USPC .......... 521/48; 528/190, 193, 194, 271, 272; 428/411.1
See application file for complete search history.

(56) References Cited

U.S. PATENT DOCUMENTS

| 10,800,897 B2 * | 10/2020 | Shin | B29B 17/00 |
| 10,800,898 B2 * | 10/2020 | Shin | B29B 9/04 |
| 2020/0115520 A1 * | 4/2020 | Shin | B29B 17/00 |
| 2021/0054140 A1 * | 2/2021 | Shin | C08J 11/12 |

FOREIGN PATENT DOCUMENTS

| JP | 2001-058622 A | 3/2001 |
| KR | 10-0981129 B1 | 9/2010 |
| KR | 10-2013-0041205 A | 4/2013 |

OTHER PUBLICATIONS

Office Action issued by Korean Patent Office dated Aug. 25, 2020.

* cited by examiner

*Primary Examiner* — Terressa Boykin
(74) *Attorney, Agent, or Firm* — IP&T Group LLP

(57) ABSTRACT

Embodiments relate to a process for regenerating a polyester container and a polyester film to be used therein, which not only solve the environmental problems by improving the recyclability of polyester containers, but also are capable of enhancing the quality, yield, and productivity. The process for regenerating a polyester container comprises providing the polyester container and a heat-shrunken polyester film that wraps at least part of the polyester container; crushing the polyester container and the heat-shrunken film to obtain flakes; and thermally treating the flakes to produce regenerated polyester chips, wherein when the flakes are thermally treated at a temperature of 200° C. to 220° C. for 60 minutes to 120 minutes, the clumping fraction is 9% or less, the flakes comprise first flakes obtained by crushing the container and second flakes obtained by crushing the heat-shrunken polyester film, the heat-shrunken polyester film comprises a copolymerized polyester resin comprising a diol component and a dicarboxylic acid component, and the amount of change in Col-a ($\Delta a$) before and after the heat-shrunken polyester film is dried at 210° C. for 90 minutes is 1.50 or less, or the amount of change in Col-b ($\Delta b$) before and after the film is dried at 210° C. for 90 minutes is 1.50 or less.

12 Claims, No Drawings

METHOD FOR REPRODUCING POLYESTER CONTAINER AND POLYESTER FILM USED IN THE METHOD

TECHNICAL FIELD

Embodiments relate to a process for regenerating a polyester container and a polyester film to be used therein, which not only solve the environmental problems by improving the recyclability of polyester containers, but also are capable of enhancing the quality, yield, and productivity thereof.

BACKGROUND ART

As concerns about environmental problems have increased in recent years, there is a demand for addressing the recycling issues of products fabricated using thermoplastic polymers. In particular, polyethylene terephthalate, a thermoplastic resin having excellent properties in terms of thermal resistivity, processability, transparency, and non-toxicity, has been widely used for producing a wide range of products such as films, fibers, bottles, containers, and the like, and efforts have been made to improve the regeneration rate thereof.

In general, a polyolefin stretch film or the like is attached to a container produced from polyethylene terephthalate as a label. Thus, once a container recycled from the consumers has been washed and crushed, it is then subjected to liquid specific gravity separation, dehydration, drying, and/or wind specific gravity separation in order to remove a large amount of films contained in the crushed product and then to such an additional step as pelletization to obtain regenerated polyester chips. However, there has been a disadvantage in that the films are not completely removed even after the above steps; and that the regenerated polyester chips are colored due to the inks contained in the film, or they are non-uniformly clumped during the thermal treatment thereof.

Accordingly, a method of using a film made of a low specific gravity polymer such as polystyrene, polyethylene, polypropylene, and the like as a label has been proposed in order to readily carry out the specific gravity separation. However, the low specific gravity thereof cannot be effectively achieved due to the ink layer, which makes it difficult to completely separate the films, and the problem that the residual ink colors the regenerated chips cannot be solved.

DISCLOSURE OF INVENTION

Technical Problem

Accordingly, embodiments aim to provide a polyester film and a process for regenerating a polyester container using the same, wherein the polyester film is readily removable from the container and capable of preventing the discoloration and clumping caused by residual ink during the regeneration process, thereby improving the recyclability of the polyester container.

Solution to Problem

According to an embodiment, there is provided a process for regenerating a polyester container, which comprises providing the polyester container and a heat-shrunken polyester film that wraps at least part of the polyester container; crushing the polyester container and the heat-shrunken polyester film to obtain flakes; and thermally treating the flakes to produce regenerated polyester chips, wherein when the flakes are thermally treated at a temperature of 200° C. to 220° C. for 60 minutes to 120 minutes, the clumping fraction is 9% or less, the flakes comprise first flakes obtained by crushing the container and second flakes obtained by crushing the heat-shrunken polyester film, the heat-shrunken polyester film comprises a copolymerized polyester resin comprising a diol component and a dicarboxylic acid component, and the amount of change in Col-a ($\Delta$a) before and after the heat-shrunken polyester film is dried at 210° C. for 90 minutes is 1.50 or less, or the amount of change in Col-b ($\Delta$b) before and after the film is dried at 210° C. for 90 minutes is 1.50 or less.

According to another embodiment, there are provided regenerated polyester chips produced by the process for regenerating a polyester container.

According to still another embodiment, there is provided a polyester film, which comprises a copolymerized polyester resin comprising a diol component and a dicarboxylic acid component, wherein the amount of change in Col-a ($\Delta$a) before and after drying the polyester film at 210° C. for 90 minutes is 1.50 or less, or the amount of change in Col-b ($\Delta$b) before and after drying the film at 210° C. for 90 minutes is 1.50 or less.

Advantageous Effects of Invention

The process for regenerating a polyester container according to the embodiment does not require a separate step of separating a polyester container and a film. Thus, it is economical since time and cost are saved.

In addition, the polyester film according to the embodiment improves the recyclability of a polyester container, thereby solving the environmental problems, and enhances the quality, yield, and productivity thereof.

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expressions relating to quantities of components, reaction conditions, and the like used herein are to be understood as being modified by the term "about" unless specifically stated otherwise.

Throughout the present specification, the terms first, second, and the like are used to describe various components. But the components should not be limited by the terms. The terms are used only for the purpose of distinguishing one component from another.

Process for Regenerating a Polyester Container

According to an embodiment, there is provided a process for regenerating a polyester container, which comprises providing the polyester container and a heat-shrunken polyester film that wraps at least part of the polyester container; crushing the polyester container and the heat-shrunken polyester film to obtain flakes; and thermally treating the flakes to produce regenerated polyester chips, wherein when the flakes are thermally treated at a temperature of 200° C. to 220° C. for 60 minutes to 120 minutes, the clumping fraction is 9% or less, the flakes comprise first flakes obtained by crushing the container and second flakes obtained by crushing the heat-shrunken polyester film, the heat-shrunken polyester film comprises a copolymerized polyester resin comprising a diol component and a dicarboxylic acid component, and the amount of change in Col-a (Δa) before and after the heat-shrunken polyester film is dried at 210° C. for 90 minutes is 1.50 or less, or the amount of change in Col-b (Δb) before and after the film is dried at 210° C. for 90 minutes is 1.50 or less.

In order to regenerate a polyester container according to an embodiment, the polyester container with a heat-shrunken polyester film that wraps at least part of the polyester container is provided (step (1)).

In the polyester container, the heat-shrunken polyester film may be provided on the outer surface of the polyester container. Specifically, the outer surface of the polyester container is covered with the polyester film, and the polyester film may be shrunken by steam or hot air to wrap at least part of the outer surface of the polyester container. In such event, the polyester film may have an ink layer formed by a process such as printing before the heat shrinkage.

In general, recycled waste products are intermingled with containers, metals, glass, plastics, and the like. Once the waste products are washed, polyester containers are classified. Then, the polyester container may be subject to a process in which the film covering the container is mechanically torn or cut to be removed. Alternatively, once the polyester container has been washed and crushed, it is then subjected to liquid specific gravity separation, dehydration, drying, and/or wind specific gravity separation, followed by such an additional step as pelletization. In such event, the quality of the regenerated polyester chips to be produced may be deteriorated due to the residual film and the ink layer formed on the residual film.

In contrast, it is possible to produce regenerated polyester chips from a polyester container wrapped with a heat-shrunken polyester film according to the embodiment even without an additional process of removing a film. Thus, it is economical since time and cost are saved.

According to an embodiment, the polyester container may comprise at least 90% by weight of a polyester resin based on the total weight of the polyester container. Specifically, the polyester container may be a container that comprises polyethylene terephthalate (PET) and may comprise polyethylene terephthalate in an amount of 90% by weight or more, 95% by weight or more, or 99% by weight or more, based on the total weight of the polyester container. But it is not limited thereto.

Thereafter, the polyester container and the heat-shrunken film are crushed to obtain flakes (step (2)).

In the polyester container, at least part of the surface of the polyester container is wrapped by the heat-shrunken polyester film. The polyester container and the film are crushed to obtain flakes. Specifically, the flakes comprise first flakes obtained by crushing the polyester container and second flakes obtained by crushing the polyester film.

According to an embodiment, the particle size of the first flakes may be 0.1 to 25 mm, and the particle size of the second flakes may be 0.1 to 25 mm. For example, the particle size of the first flakes may be 0.3 to 23 mm, 0.5 to 20 mm, 1 to 20 mm, 0.5 to 15 mm, 0.5 to 13 mm, 1 to 18 mm, 1 to 15 mm, 1 to 13 mm, or 2 to 10 mm. The particle size of the second flakes may be 0.3 to 23 mm, 0.5 to 20 mm, 1 to 20 mm, 0.5 to 15 mm, 0.5 to 13 mm, 1 to 18 mm, 1 to 15 mm, 1 to 13 mm, or 2 to 10 mm. But they are not limited thereto.

According to an embodiment, the flakes may be immersed in a 0.5% to 3% aqueous solution of NaOH for 5 minutes to 30 minutes to be cleaned. For example, the first flakes and second flakes may be immersed in a 0.5% to 2.5% or 0.5% to 1.5% aqueous solution of NaOH for 5 minutes to 25 minutes or 10 minutes to 20 minutes to be cleaned. Impurities remaining in the flakes during the process may be removed by carrying out the cleaning step.

According to an embodiment, the flakes may be washed after the cleaning step. For example, the flakes may be washed with water at room temperature or a 0.5% to 3% aqueous solution of NaOH at 80° C. to 97° C. for 5 minutes to 30 minutes. A part or all of the ink layer remaining in the flakes may be removed by carrying out the washing step.

According to an embodiment, the flakes may be dried at 60° C. to 175° C. for 10 minutes to 30 minutes after the washing step. For example, the flakes may be dried at 60° C. to 175° C., 70° C. to 170° C., or 80° C. to 160° C. for 10 minutes to 30 minutes, 10 minutes to 25 minutes, or 15 minutes to 30 minutes after the washing step.

The cleaning, washing, and drying steps may be carried out once to five times repeatedly. Specifically, the impurities and ink layer remaining in the flakes can be effectively removed by repeatedly carrying out the cleaning, washing, and drying steps two to five times or three to five times.

Finally, the flakes are thermally treated to produce regenerated polyester chips (step (3)).

The thermal treatment may be carried out at 200° C. to 220° C. for 60 minutes to 120 minutes. For example, the thermal treatment may be carried out at 200° C. to 215° C. or 205° C. to 220° C. for 70 minutes to 120 minutes or 80 minutes to 120 minutes.

Regenerated polyester chips that comprise the flakes may be obtained after the thermal treatment step. Specifically, regenerated polyester chips that comprise the first flakes and the second flakes may be obtained. For example, the flakes may be melt-extruded and cut to obtain regenerated polyester chips.

Regenerated Polyester Chips

According to an embodiment, the regenerated polyester chips may comprise first flakes comprising polyethylene terephthalate and second flakes comprising a copolymerized polyester resin.

According to an embodiment, the regenerated polyester chips may have an intrinsic viscosity (IV) of 0.60 dl/g or more. For example, the regenerated polyester chips may have an intrinsic viscosity (IV) of 0.63 dl/g or more, 0.65 dl/g or more, 0.70 dl/g or more, 0.75 dl/g or more, 0.60 to 3.00 dl/g, 0.60 to 2.0 dl/g, or 0.65 to 1.0 dl/g.

According to an embodiment, when the flakes are thermally treated at a temperature of 200° C. to 220° C. for 60 minutes to 120 minutes, the clumping fraction may be 9% or less. For example, when the flakes are thermally treated at 220° C. for 60 minutes or at 210° C. for 90 minutes, the clumping fraction may be 9% or less, 8% or less, 5% or less, 4% or less, 3% or less, 2.5% or less, 1% or less, or 0.8% or less.

The clumping refers to an aggregate that may be formed from the flakes. The size of the aggregate may be, for example, at least three times the size of the flake particles. The clumping fraction refers to the fraction of the aggregates based on the total weight of the flakes. For example, the flakes may be passed through a sieve and thermally treated. At that time, aggregates may be formed as the flakes are clumped. The aggregates may be passed through a sieve again to be separated. The weight of the aggregates thus obtained is measured to calculate the weight ratio of the aggregates based on the total weight of the thermally treated flakes as the clumping fraction.

Thus, the higher the value of the crumbling fraction is, the more the first flakes and the second flakes are entangled together to lower the quality of the regenerated chips. However, the second flakes are obtained by crushing the polyester film according to the embodiment, thereby effectively reducing or preventing the formation of aggregates and enhancing the quality of the regenerated polyester chips.

According to an embodiment, the regenerated polyester chips may comprise 70 to 990% by weight of polyethylene terephthalate and 1 to 30% by weight of a copolymerized polyester resin based on the total weight of regenerated polyester chips. For example, the regenerated polyester chips may comprise 80 to 99% by weight, 90 to 99% by weight, or 95 to 99% by weight of polyethylene terephthalate and 1 to 20% by weight, 1 to 10% by weight, or 1 to 5% by weight of a copolymerized polyester resin based on the total weight of the regenerated polyester chips.

Polyester Film

According to an embodiment, there is provided a polyester film, which comprises a copolymerized polyester resin comprising a diol component and a dicarboxylic acid component, wherein the amount of change in Col-a (Δa) before and after the polyester film is dried at 210° C. for 90 minutes is 1.50 or less, or the amount of change in Col-b (Δb) before and after the film is dried at 210° C. for 90 minutes is 1.50 or less.

According to an embodiment, the copolymerized polyester resin comprises a diol component and a dicarboxylic acid component.

According to an embodiment, the diol component may be composed of a linear or branched $C_2$ to $C_{10}$ diol. That is, the diol component may not comprise an alicyclic diol or an aromatic diol.

For example, the linear or branched $C_2$ to $C_{10}$ diol may comprise ethylene glycol, diethylene glycol, neopentyl glycol, 1,3-propanediol, 1,2-octanediol, 1,3-octanediol, 2,3-butanediol, 1,3-butanediol, 1,4-butanediol, 1,5-pentanediol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, 1,6-hexanediol, 2-ethyl-3-methyl-1,5-hexanediol, 2-ethyl-3-ethyl-1,5-hexanediol, 1,7-heptanediol, 2-ethyl-3-methyl-1,5-heptanediol, 2-ethyl-3-ethyl-1,6-heptanediol, 1,8-octanediol, 1,9-nonanediol, 1,10-decanediol, a derivative thereof, or any combination thereof. But it is not limited thereto.

According to an embodiment, the diol component may comprise at least one selected from the group consisting of ethylene glycol, diethylene glycol, cyclohexanedimethanol (CHDM), propanediol unsubstituted or substituted with an alkyl group, butanediol unsubstituted or substituted with an alkyl group, pentanediol unsubstituted or substituted with an alkyl group, hexanediol unsubstituted or substituted with an alkyl group, octanediol unsubstituted or substituted with an alkyl group, and a combination thereof.

According to an embodiment, the diol component may comprise ethylene glycol, diethylene glycol, 1,4-cyclohexanedimethanol, 1,3-propanediol, 1,2-octanediol, 1,3-octanediol, 2,3-butanediol, 1,3-butanediol, 1,4-butanediol, 1,5-pentanediol, neopentyl glycol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, or a combination thereof.

According to an embodiment, the diol component may be at least one selected from the group consisting of ethylene glycol, diethylene glycol, neopentyl glycol, and cyclohexanedimethanol.

According to an embodiment, the copolymerized polyester resin may comprise ethylene glycol in an amount of 55 to 90% by mole based on the total number of moles of the diol component. For example, the copolymerized polyester resin may comprise ethylene glycol in an amount of 60 to 90% by mole, 63 to 85% by mole, or 65 to 83% by mole, based on the total number of moles of the diol component. If the above range is satisfied, the heat shrinkage rate of a film thus prepared can be adjusted to a proper level, and the clumping fraction in the subsequent regeneration step can be reduced.

According to an embodiment, the copolymerized polyester resin may comprise diethylene glycol in an amount of 1 to 15% by mole based on the total number of moles of the diol component. For example, the copolymerized polyester resin may comprise diethylene glycol in an amount of 1 to 12% by mole, 1 to 10% by mole, 1 to 8% by mole, or 1.5 to 5% by mole, based on the total number of moles of the diol component. If the above range is satisfied, the heat shrinkage rate of a film thus prepared can be adjusted to a proper level, and the clumping fraction in the subsequent regeneration step can be reduced.

According to an embodiment, the copolymerized polyester resin may comprise neopentyl glycol in an amount of 1 to less than 30% by mole based on the total number of moles of the diol component. For example, the copolymerized polyester resin may comprise neopentyl glycol in an amount of 5 to less than 30% by mole, 7 to less than 30% by mole, 10 to 25% by mole, or 13 to 25% by mole, based on the total number of moles of the diol component. If the above range is satisfied, a polyester film having a heat shrinkage rates in a first direction and in a second direction perpendicular to the first direction that are not high even at a high temperature can be prepared. In particular, if the content of neopentyl glycol exceeds the above range, the film may excessively expand in the second direction as compared with the first direction, so that wrinkles or deformation may occur when the film is applied to a container. In addition, if the content of neopentyl glycol is less than the above range, the amorphous region becomes large, whereby the expansion coefficient would be increased due to the low shrinkage characteristics in the second direction although the shrinkage characteristics in the first direction could be improved.

In this specification, the first direction is the main shrinkage direction, which may be the transverse direction or the longitudinal direction. Specifically, the first direction may be the transverse direction, and the second direction that is perpendicular to the first direction may be the longitudinal direction. Alternatively, the first direction may be the longitudinal direction, and the second direction that is perpendicular to the first direction may be the transverse direction.

According to an embodiment, the copolymerized polyester resin may comprise cyclohexanedimethanol in an amount of 1 to less than 30% by mole based on the total number of moles of the diol component. For example, the copolymerized polyester resin may comprise cyclohexanedimethanol in an amount of 1 to 23% by mole, 1 to 15% by mole, 1 to 10% by mole, or 1 to 5% by mole, based on the total number of moles of the diol component. If the above range is satisfied, the heat shrinkage rate of a film thus prepared can be adjusted to a proper level, and the clumping fraction in the subsequent regeneration step can be reduced.

According to another embodiment, the copolymerized polyester resin may further comprise a monohydric alcohol in addition to the diol component. For example, the monohydric alcohol may be methanol, ethanol, isopropyl alcohol, allyl alcohol, or benzyl alcohol. Specifically, the copolymerized polyester resin may comprise a monohydric alcohol in an amount of 10 to 30% by mole, 13 to 25% by mole, or 15 to 22% by mole, based on the total number of moles of the diol component and the monohydric alcohol. But it is not limited thereto.

The dicarboxylic acid component may be selected from the group consisting of an aromatic dicarboxylic acid such as terephthalic acid, dimethylterephthalic acid, isophthalic acid, naphthalene dicarboxylic acid, orthophthalic acid, and the like; an aliphatic dicarboxylic acid such as adipic acid, azelaic acid, sebacic acid, decanedicarboxylic acid, and the like; an alicyclic dicarboxylic acid; an ester thereof; and a combination thereof. Specifically, the dicarboxylic acid component may be composed of terephthalic acid, dimethyl terephthalic acid, isophthalic acid, naphthalene dicarboxylic acid, orthophthalic acid, or a combination thereof.

According to an embodiment, the dicarboxylic acid component may comprise an aromatic dicarboxylic acid. For example, the dicarboxylic acid component may comprise at least 80% by mole, at least 90% by mole, or at least 95% by mole of terephthalic acid or dimethyl terephthalic acid based on the total number of moles of the dicarboxylic acid component.

The dicarboxylic acid component and the diol component as described above are subjected to a transesterification reaction and then polymerization to thereby form a copolymerized polyester resin. Specifically, at least one catalyst selected from manganese acetate, calcium acetate, and zinc acetate may be used as a catalyst for the transesterification reaction. The content of the catalyst may be 0.02 to 0.2% by weight based on the total weight of the dicarboxylic acid compound. Upon completion of the transesterification reaction, at least one additive selected from silica, potassium, and magnesium; a stabilizer such as trimethyl phosphate; a polymerization catalyst selected from antimony trioxide and tetrabutylene titanate; and the like may be selectively added to carry out the reaction, to thereby prepare a copolymerized polyester resin composition.

According to an embodiment, the polyester film may have a glass transition temperature (Tg) of 60° C. or higher as measured by differential scanning calorimetry. For example, the polyester film may have a glass transition temperature of 60° C. or higher, 65° C. or higher, 70° C. to less than 80° C., or 70° C. to 75° C., as measured by differential scanning calorimetry. If the above range is satisfied, the clumping fraction in the subsequent regeneration step can be reduced.

According to an embodiment, the polyester film may have a heat shrinkage rate of 30% or more in the first direction upon thermal treatment at a temperature of 80° C. for 10 seconds. For example, the polyester film may have a heat shrinkage rate of 35% or more, 40% or more, 45% or more, 50% or more, 30% to 85%, 40% to 80%, or 50% to 80%, in the first direction upon thermal treatment at a temperature of 80° C. for 10 seconds. If the above range is satisfied, it is easy to attach and label the polyester film on the surface of a container.

According to an embodiment, the amount of change in Col-a ($\Delta a$) before and after the polyester film is dried at 210° C. for 90 minutes may be 1.50 or less. For example, the amount of change in Col-a ($\Delta a$) before and after the polyester film is dried at 210° C. for 90 minutes may be 1.45 or less or 1.42 or less. Specifically, the value of Col-a measured before the polyester film is dried may be −0.4 to −2.0, −0.5 to −1.8, or −0.8 to −1.6, and the value of Col-a measured after the polyester film is dried at 210° C. for 90 minutes may be −1.0 to −3.0 or −1.3 to −2.9. If the above range is satisfied, the discoloration of the regenerated polyester chips that may occur in the subsequent regeneration process can be effectively prevented.

According to an embodiment, or the amount of change in Col-b ($\Delta b$) before and after the film is dried at 210° C. for 90 minutes is 1.50 or less. For example, the amount of change in Col-b ($\Delta b$) before and after the polyester film is dried at 210° C. for 90 minutes may be 1.45 or less, 1.30 or less, or 1.10 or less. Specifically, the value of Col-b measured before the polyester film is dried may be 0.5 to 1.5, 0.6 to 1.1, or 0.7 to 1.2, and the value of Col-b measured after the polyester film is dried at 210° C. for 90 minutes may be 1.0 to 2.5, 1.2 to 2.3, 1.5 to 2.1, or 1.8 to 2.1. If the above range is satisfied, the discoloration of the regenerated polyester chips that may occur in the subsequent regeneration process can be effectively prevented.

Col-a and Col-b are color coordinates established by the Commission International d'Eclairage (CIE), where color is represented by L (Luminosity), a (green to red complementary color), and b (yellow to blue complementary color). They can be measured using UltraScan PRO (manufacturer: Hunterlab).

According to an embodiment, the polyester film may have a heat shrinkage rate of 50% or more in the first direction upon thermal treatment at a temperature of 90° C. for seconds. For example, the polyester film may have a heat shrinkage rate of 55% or more, 60% or more, 70% or more, 50% to 90%, 60% to 85%, 70% to 85%, or 70% to 80%, in the first direction upon thermal treatment at a temperature of 90° C. for 10 seconds. If the above range is satisfied, it is easy to attach and label the polyester film on the surface of a container.

According to an embodiment, the polyester film may have a heat shrinkage rate of 1% to 55% in the first direction upon thermal treatment at a temperature of 70° C. for 10 seconds. For example, the polyester film may have a heat shrinkage rate of 1% to 50%, 3% to 50%, 5% to 50%, 10% to 50%, 20% to 45%, or 25% to 40%, in the first direction upon thermal treatment at a temperature of 70° C. for 10 seconds. If the above range is satisfied, it is easy to attach and label the polyester film on the surface of a container.

According to an embodiment, the polyester film may have a heat shrinkage rate of 30% or more in the first direction upon thermal treatment at a temperature of 100° C. for 10 seconds. For example, the polyester film may have a heat shrinkage rate of 35% or more, 40% or more, 50% or more, 30% to 90%, 30% to 80%, 40% to 80%, 45% to 80%, or 50% to 80%, in the first direction upon thermal treatment at a temperature of 100° C. for 10 seconds. If the above range is satisfied, it is easy to attach and label the polyester film on the surface of a container.

According to an embodiment, the polyester film has a melting point (Tm) of 170° C. or higher as measured by differential scanning calorimetry. For example, the polyester film may have a melting point of 170° C. or higher, 175° C. or higher, specifically 170° C. to 230° C., 170° C. to 200° C., or 175° C. to 200° C., as measured by differential scanning calorimetry. If the above range is satisfied, the clumping fraction in the subsequent regeneration step can be reduced.

According to an embodiment, the crystallization temperature (Tc) of the polyester film is not measured or is 70° C. to 130° C. by differential scanning calorimetry. For example, the crystallization temperature (Tc) of the polyester film is not measured or may be 70° C. to 120° C., 75° C. to 110° C., or 80° C. to 110° C. by differential scanning calorimetry. If the above range is satisfied, the clumping fraction in the subsequent regeneration step can be reduced.

According to an embodiment, the heat of crystallization of the polyester film may be 0.01 to 50 J/g as measured at the crystallization temperature (Tc). For example, the heat of crystallization of the polyester film may be 0.01 to 40 J/g, 0.05 to 30 J/g, 0.1 to J/g, 0.1 to 10 J/g, 0.1 to 8 J/g, or 0.1 to 5 J/g, as measured at the crystallization temperature (Tc). If the above range is satisfied, the clumping fraction in the subsequent regeneration step can be reduced.

Specifically, if the melting point (Tm) of the polyester film is 170° C. or higher and the crystallization temperature (Tc) is 70° C. to 130° C. as measured by differential scanning calorimeter, the effect of reducing the clumping fraction can be the most excellent.

According to an embodiment, the polyester film may have a haze of 10% or less. For example, the polyester film may have a haze of 8% or less, 7% or less, or 5% or less.

According to an embodiment, the polyester film may have a thickness of 10 μm to 100 μm. For example, the thickness of the polyester film may be 20 μm to 80 μm or 30 μm to 70 μm. If the above range is satisfied, the shrinkage uniformity and printability is excellent.

Process for Preparing a Polyester Film

A polyester film may be prepared from the copolymerized polyester resin.

Specifically, the copolymerized polyester resin may be melt-extruded at 260° C. to 300° C. or 270° C. to 290° C. through a T-die and then cooled to obtain an unstretched sheet. The unstretched sheet is passed through rolls while it is conveyed at a speed of 10 m/min to 110 m/min or 50 m/min to 90 m/min, preheated, and then stretched to obtain a stretched sheet, which is heat set to prepare a polyester film.

The preheating may be carried out at 90° C. to 120° C. for 0.01 to 1 minute. For example, the preheating temperature (T1) may be 95° C. to 115° C. or 97° C. to 113° C., and the preheating time may be 0.05 minute to 0.5 minute or 0.08 minute to 0.2 minute. But they are not limited thereto.

The stretching may be carried out in a first direction and then in a second direction that is perpendicular to the first direction. Specifically, the stretching may be carried out at a temperature lower than the preheating temperature (T1) by at least 20° C. in a first direction by 3 to 5 times and then in a second direction by 3 to 5 times. For example, the stretching may be carried out at a stretching temperature of 60° C. to 90° C., 70° C. to 90° C., or 75° C. to 85° C., in a first direction and in a second direction by 3 to 4.5 times, 3.5 to 4.5 times, or 4 to 4.5 times, respectively. But it is not limited thereto.

The heat setting may be annealing and carried out at 70° C. to 95° C. for 0.01 minute to 1 minute. For example, the heat setting temperature (T2) may be 75° C. to 95° C., 75° C. to 90° C., 80° C. to 90° C., 85° C. to 95° C., or 85° C. to 90° C., and the heat setting time may be 0.05 minute to 0.5 minute or 0.08 minute to 0.2 minute. But they are not limited thereto.

According to an embodiment, the preheating temperature (T1)–the heat setting temperature (T2) may be 10° C. to 40° C. For example, T1–T2 may be 13° C. to 35° C., 11° C. to 34° C., 15° C. to 34° C., or 20° C. to 30° C. If the above range is satisfied, the heat shrinkage rates in the first direction and in the second direction may be effectively controlled.

MODE FOR THE INVENTION

Hereinafter, the present invention will be described in more detail with reference to the following examples. However, these examples are set forth to illustrate the present invention, and the scope of the present invention is not limited thereto.

EXAMPLE

Example 1

Preparation of a Copolymerized Polyester Resin

A stainless steel autoclave equipped with a stirrer, a thermometer, and a partial reflux condenser was charged with 100% by mole of terephthalic acid (TA) as a dicarboxylic acid component and 80.5% by mole of ethylene glycol (EG), 2% by mole of cyclohexanedimethanol (CHDM), 14% by mole of neopentyl glycol (NPG), and 3.5% by mole of diethylene glycol (DEG) as a diol component. Then, 0.05% by mole (based on the acid component) of zinc acetate as a transesterification catalyst was added thereto. The transesterification reaction was carried out while methanol was being distilled off. Thereafter, 0.025% by mole (based on the acid component) of antimony trioxide as a polycondensation catalyst was added, and the polycondensation reaction was carried out under a reduced pressure of 26.6 Pa (0.2 Torr) at 280° C. to obtain a copolymerized polyester resin.

Preparation of a Polyester Film

The copolymerized polyester resin was fed to an extruder and then melt-extruded at 280° C. through a T-die, which was cooled to obtain an unstretched sheet. Then, the unstretched sheet was passed through rolls at 75° C. to be stretched by 3.0 to 3.9 times while it was conveyed at a speed of 55 m/min and then preheated at 100° C. to 110° C. for 0.1 minute. Thereafter, the sheet was stretched 4.0 to 4.7 times in the transverse direction at 85° C. and then heat set at 90° C. for 0.1 minute to obtain a polyester film having a thickness of 40 μm.

Preparation of a Polyester Container Wrapped with a Polyester Film

The outer surface of a polyethylene terephthalate container (PET container, 30 g) was wrapped with the polyester film (1 g) prepared above using an acrylate-based adhesive. The polyester film was shrunken in hot air at a temperature of 90° C. to obtain a polyester container wrapped with a heat-shrunken polyester film.

Process for Regenerating a Polyester Container

The container wrapped with the polyester film was crushed with a crusher to obtain flakes. The flakes were washed with water and then washed for 15 minutes with a corrosion washing solution (a mixture of a solution of 0.3% by weight of Triton X-100 and a solution of 1.0% by weight of NaOH) stirred in a bath at 85° C. to 90° C. at 880 rpm. Thereafter, the flakes were washed with water at room temperature to remove the residual corrosion washing solution, dried at 160° C. for 20 minutes, and then thermally treated at 210° C. to produce regenerated polyester chips.

Examples 2 to 4 and Comparative Examples 1 and 2

Regenerated polyester chips were prepared in the same manner as in Example 1, except that the components and contents were changed as shown in Table 1 below, respectively.

TABLE 1

|  | Ex. 1 | Ex. 2 | Ex. 3 | Ex. 4 | C. Ex. 1 | C. Ex. 2 |
|---|---|---|---|---|---|---|
| TA (% by mole) | 100 | 100 | 100 | 100 | 100 | 100 |
| CHDM (% by mole) | 2 | — | — | — | 30 | — |
| NPG (% by mole) | 14 | 17 | 24 | — | — | 30 |
| IPA (% by mole) | — | — | — | 18 | — | — |
| DEG (% by mole) | 3.5 | — | — | 1.5 | 1.5 | — |
| EG (% by mole) | 80.5 | 78 | 71 | 80.5 | 68.5 | 70 |

* IPA: isopropyl alcohol

Test Example 1: Measurement of Glass Transition Temperature (Tg)

The changes in endotherm and exotherm of the polyester films (10 mg) prepared above were each measured with Differential Scanning Calorimetry-Mettler Toledo DSC 1 while the temperature was raised at a rate of 10° C./min from 30° C. to 250° C. In the measurement results, the first endothermic temperature was taken as the glass transition temperature (Tg).

Test Example 2: Measurement of Clumping

The flakes prepared above were passed through a 0.625"-sieve. 1 kg of the flakes thus sieved (in which the first flakes and the second flakes were mixed at a ratio of 97:3) was exposed in an oven at 210° C. for 90 minutes. The flakes were cooled to room temperature and passed through a 0.625"-sieve. The weight of the aggregates thus filtered out was measured and calculated as a percentage of the total weight of the flakes.

Test Example 3: Measurement of Col-a and Col-b

Col-a and Col-b of the polyester films prepared above were each measured using UltraScan PRO (manufacturer: Hunterlab). Then, Col-a and Col-b after the film was dried in an oven at 210° C. for 90 minutes were each measured.

The results of Test Examples 1 to 3 are shown in Table 2 below.

TABLE 2

|  |  | Ex. 1 | Ex. 2 | Ex. 3 | Ex. 4 | C. Ex. 1 | C. Ex. 2 |
|---|---|---|---|---|---|---|---|
| Tg (° C.) |  | 75 | 75 | 70 | 75 | 80 | 68 |
| Col-a | Before drying | −0.85 | −1.01 | −1.51 | −1.41 | −0.75 | −0.32 |
|  | After drying | −1.30 | −2.04 | −2.34 | −2.83 | −2.00 | −1.86 |
|  | Δa | 0.45 | 1.03 | 0.83 | 1.42 | 1.75 | 1.54 |
| Col-b | Before drying | 1.15 | 0.73 | 1.15 | 1.09 | 1.10 | 1.32 |
|  | After drying | 1.83 | 1.82 | 2.08 | 1.98 | 3.50 | 2.90 |
|  | Δb | 0.68 | 1.09 | 0.93 | 0.89 | 2.40 | 1.58 |
| Clumping fraction (%) |  | 0.15 | 0.2 | 0.8 | 5.1 | 10 | 9.8 |

As shown in Table 2 above, the regenerated polyester chips prepared in Examples 1 to 4 according to the process for regenerating a polyester container had a low clumping fraction and were excellent in quality.

The invention claimed is:

1. A process for regenerating a polyester container, which comprises:

providing the polyester container and a heat-shrunken polyester film that wraps at least part of the polyester container;

crushing the polyester container and the heat-shrunken polyester film to obtain flakes; and thermally treating the flakes to produce regenerated polyester chips, wherein when the flakes are thermally treated at a temperature of 200° C. to 220° C. for 60 minutes to 120 minutes, the clumping fraction is 9% or less, the flakes comprise first flakes obtained by crushing the container and second flakes obtained by crushing the heat-shrunken polyester film, the heat-shrunken polyester film comprises a copolymerized polyester resin comprising a diol component and a dicarboxylic acid component, and the amount of change in Col-a (Δa) before and after the heat-shrunken polyester film is dried at 210° C. for 90 minutes is 1.50 or less, or the amount of change in Col-b (Δb) before and after the film is dried at 210° C. for 90 minutes is 1.50 or less.

2. The process for regenerating a polyester container of claim 1, wherein the container comprises polyethylene terephthalate in an amount of 90% by weight or more.

3. The process for regenerating a polyester container of claim 1, wherein the particle size of the first flakes is 0.1 to 25 mm, and the particle size of the second flakes is 0.1 to 25 mm.

4. Regenerated polyester chips prepared according to the regeneration process of claim 1.

5. The regenerated polyester chips of claim 4, which comprise first flakes that comprise polyethylene terephthalate and second flakes that comprise a copolymerized polyester resin.

6. A polyester film to be regenerated with a polyester container, which comprises a copolymerized polyester resin comprising a diol component and a dicarboxylic acid component, wherein the amount of change in Col-a (Δa) before and after the polyester film is dried at 210° C. for 90 minutes is 1.50 or less, or the amount of change in Col-b (Δb) before and after the polyester film is dried at 210° C. for 90 minutes is 1.50 or less.

7. The polyester film to be regenerated with a polyester container of claim 6, which has a heat shrinkage rate of 30% or more in the main shrinkage direction upon thermal treatment at a temperature of 80° C. for 10 seconds.

8. The polyester film to be regenerated with a polyester container of claim 6, which has a glass transition temperature (Tg) of 60° C. or higher as measured by differential scanning calorimetry.

9. The polyester film to be regenerated with a polyester container of claim 6, wherein the diol component is at least one selected from the group consisting of ethylene glycol, diethylene glycol, neopentyl glycol, isopropyl alcohol, and cyclohexanedimethanol.

10. The polyester film to be regenerated with a polyester container of claim 6, wherein the copolymerized polyester resin comprises ethylene glycol in an amount of 55 to 90% by mole and diethylene glycol in an amount of 1 to 15% by mole based on the total number of moles of the diol component.

11. The polyester film to be regenerated with a polyester container of claim 6, wherein the copolymerized polyester resin comprises neopentyl glycol in an amount of 1 to less than 30% by mole based on the total number of moles of the diol component.

12. The polyester film to be regenerated with a polyester container of claim 6, wherein the copolymerized polyester resin comprises cyclohexanedimethanol in an amount of 1 to less than 30% by mole based on the total number of moles of the diol component.

* * * * *